(12) United States Patent (10) Patent No.: US 7,768,915 B2
Nakai (45) Date of Patent: Aug. 3, 2010

(54) MAIN APPARATUS AND CONTROL SIGNAL DISTRIBUTION REGULATION METHOD

(75) Inventor: Hideaki Nakai, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/405,676

(22) Filed: Mar. 17, 2009

(65) Prior Publication Data

US 2009/0296575 A1 Dec. 3, 2009

(30) Foreign Application Priority Data

May 30, 2008 (JP) ............................. 2008-143362

(51) Int. Cl.
*H04L 12/26* (2006.01)
(52) U.S. Cl. ........................ 370/230; 370/238; 379/260
(58) Field of Classification Search ......... 370/229–238; 379/260–277
See application file for complete search history.

(56) References Cited

U.S. PATENT DOCUMENTS 5,283,817 A * 2/1994 Hara et al. .................. 455/463

2007/0160056 A1 7/2007 Matsumoto et al.
2007/0297598 A1 12/2007 Kaneko et al.
2008/0212482 A1* 9/2008 Nakayma et al. ............. 370/237
2008/0239964 A1* 10/2008 Mitsutake ................... 370/237

FOREIGN PATENT DOCUMENTS

JP 10-190730 7/1998
JP 2007-184798 7/2007

* cited by examiner

*Primary Examiner*—Ricky Ngo
*Assistant Examiner*—Gary Mui
(74) *Attorney, Agent, or Firm*—Blakely, Sokoloff, Taylor & Zafman LLP

(57) ABSTRACT

According to one embodiment, a main apparatus includes a transmitter which transmits a control signal necessary for notifying the communication connection to a first telephone terminal belonging to the group and a second telephone terminal belonging to the group, when the first telephone terminal establishes communication connection by using the line, a monitoring module configured to monitor congestion of at least an own apparatus, and a controller which controls execution and stoppage of transmission processing of the control signal to the second telephone terminal carried out by the transmitter based on a result of congestion monitoring carried out by the monitoring module.

9 Claims, 7 Drawing Sheets

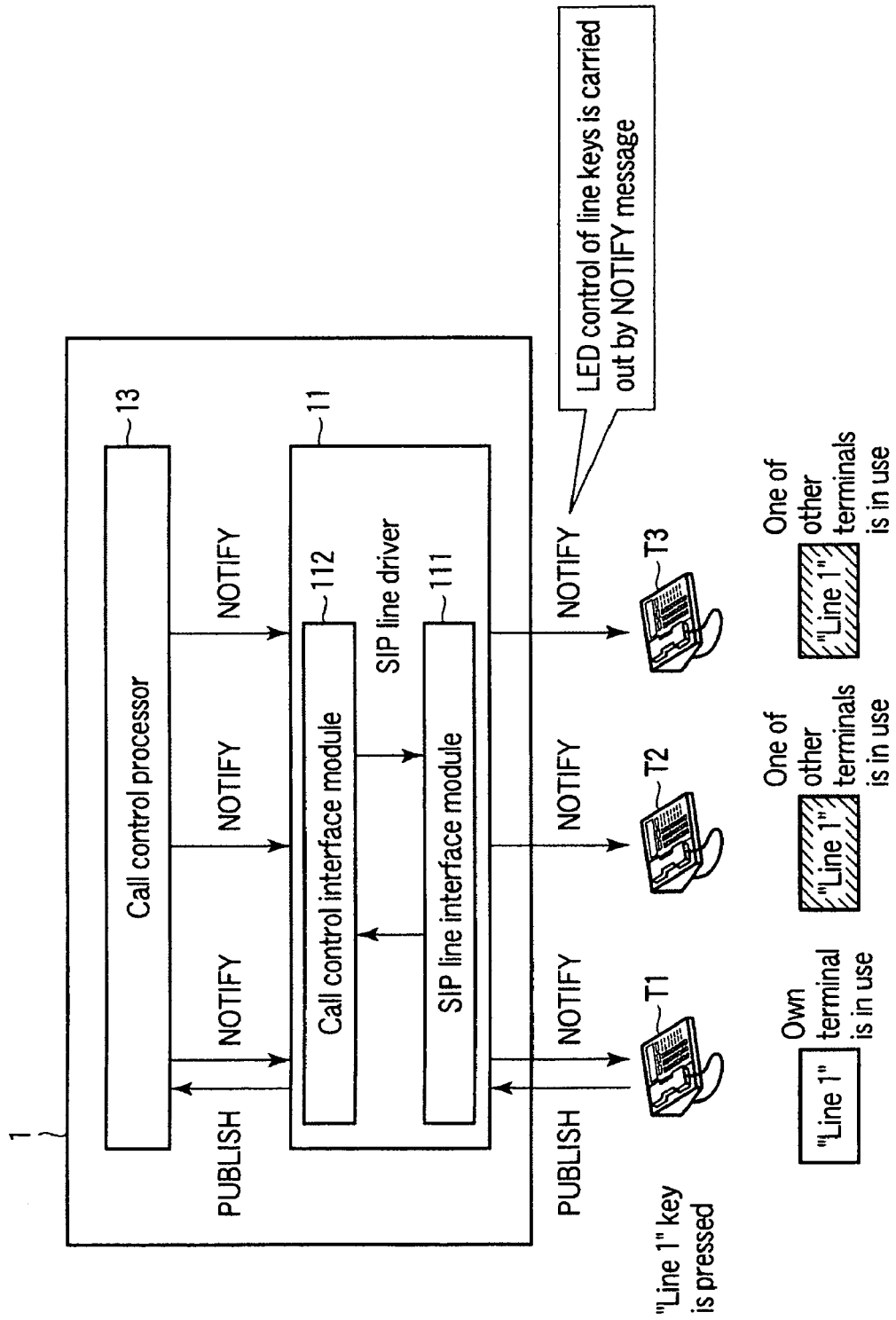
F I G. 4

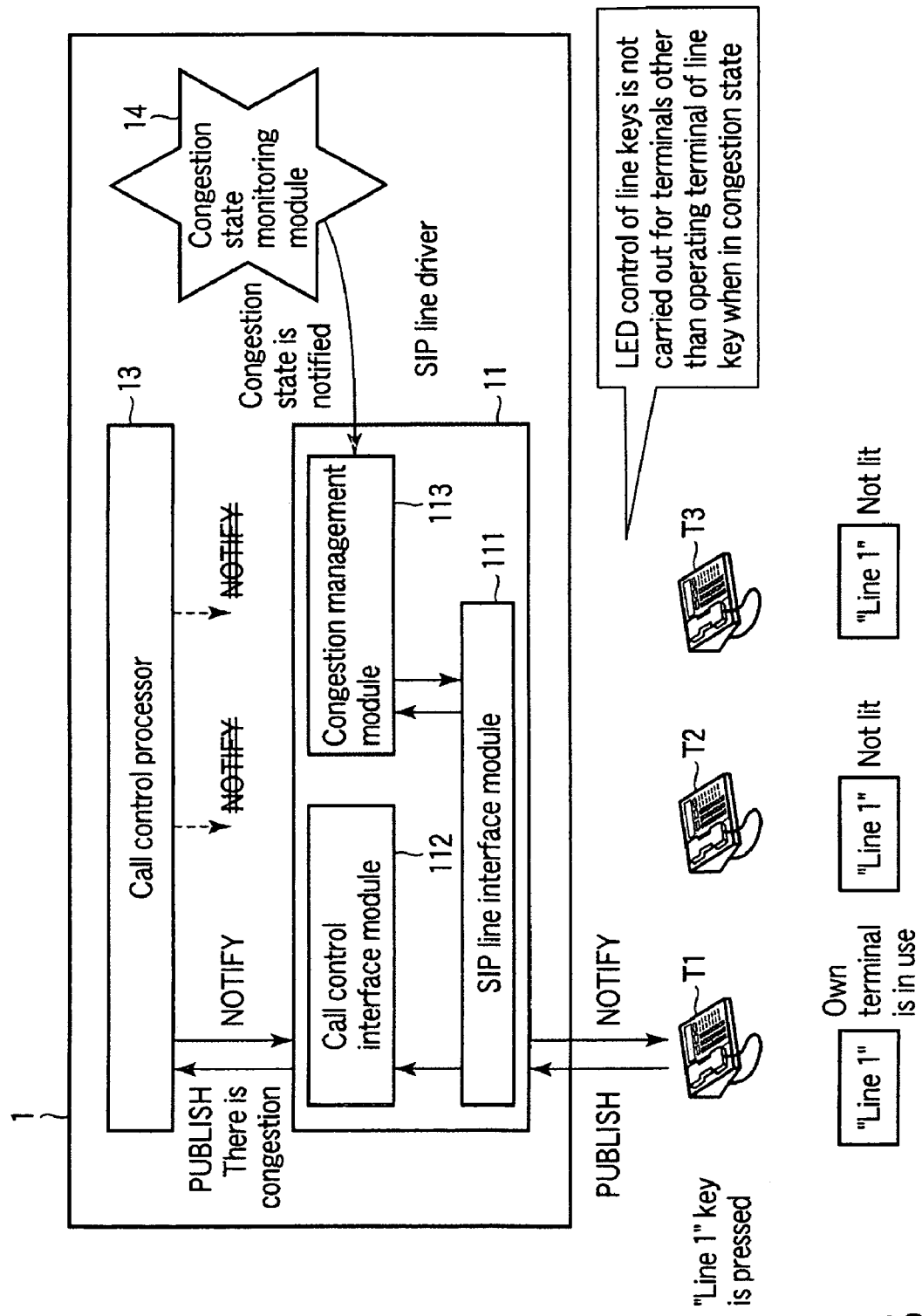
F I G. 5

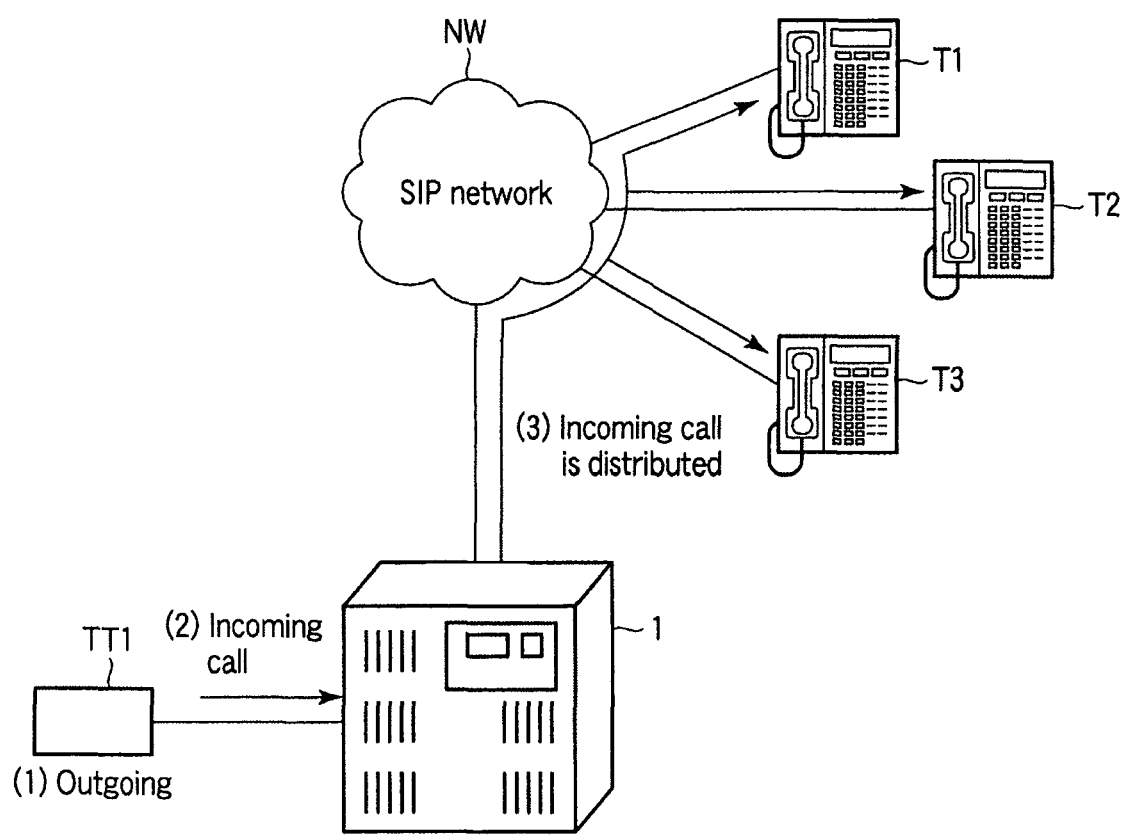
F I G. 7

MAIN APPARATUS AND CONTROL SIGNAL DISTRIBUTION REGULATION METHOD

CROSS-REFERENCE TO RELATED APPLICATIONS

This application is based upon and claims the benefit of priority from Japanese Patent Application No. 2008-143362, filed May 30, 2008, the entire contents of which are incorporated herein by reference.

BACKGROUND

1. Field

One embodiment of the invention relates to a main apparatus that is used, for example, for an internet protocol (IP) telephone system, and a control signal distribution regulation method used in the main apparatus.

2. Description of the Related Art

In recent years, an IP telephone system, in which an image and voice are exchanged interactively in real time through an IP network, has started to become widespread. In this IP telephone system, not to mention that each main apparatus connected to an IP network can carry out inter-extension communication and call incoming and outgoing using an external line, extension communication and call incoming and outgoing using an external line between main apparatuses through an IP network can be carried out.

With respect to the main apparatus, when a user using a terminal A presses a "Line" key to carry out call origination operation, a NOTIFY message is transmitted to a terminal B and a terminal C in which the same "Line" key is registered, and light emitting diode (LED) control or liquid crystal display (LCD) control of the "Line" key is carried out depending on a call state. Also, for multi-appearance that distributes an incoming call addressed to a group, in which the same "Line" key is registered, to terminals in the group, the NOTIFY message is transmitted, and LED control or the LCD control of the "Line" key is carried out depending on a call state.

In the above IP telephone system, the main apparatus is shared by a number of terminals, personal computers, and the like on an IP network. Therefore, the main apparatus is well predicted to be in a congestion state. When the main apparatus is in a congestion state, influences, such as loss of real time, are provided to services, such as communication connection between terminals corresponding to call incoming and outgoing.

In view of the above, a conventional communication system proposes a method, in which an SIP server monitors congestion, and when there is regulation during congestion, all incoming and outgoing calls are regulated, except for a call for which priority is registered, so that a load of a system is reduced (for example, Jpn. Pat. Appln. Publication No. 2007-184798).

There has been strong demand for a method that can efficiently process at least services relating to call incoming and outgoing even when the main apparatus is in a congestion state, in the IP telephone system.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 4 is a sequence diagram shown to explain distribution operation of a control signal in a normal state in the first embodiment;

FIG. 5 is a sequence diagram shown to explain distribution operation of a control signal in a congestion state in the first embodiment;

FIG. 7 is a sequence diagram shown to explain operation of multi-appearance in a second embodiment of the present invention.

DETAILED DESCRIPTION

Various embodiments according to the invention will be described hereinafter with reference to the accompanying drawings, in general, according to one embodiment of the invention, a main apparatus which connects to an internet protocol (IP) network including a plurality of lines to connect a plurality of telephone terminals, and executes communication connection between the plurality of telephone terminals, at least some of the plurality of telephone terminals are included in a group sharing at least one of the lines, the apparatus comprising: a transmitter which transmits a control signal necessary for notifying the communication connection to a first telephone terminal belonging to the group and a second telephone terminal belonging to the group, when the first telephone terminal establishes communication connection by using the line; a monitoring module configured to monitor congestion of at least an own apparatus; and a controller which controls execution and stoppage of transmission processing of the control signal to the second telephone terminal carried out by the transmitter based on a result of congestion monitoring carried out by the monitoring module.

First Embodiment

Figure 1:
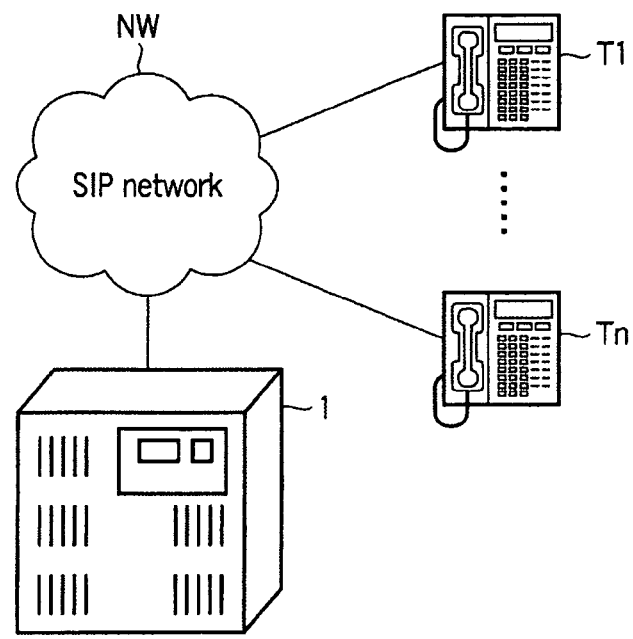
FIG. 1 shows a schematic configuration diagram of an IP telephone system according to a first embodiment of the present invention.

FIG. 1 shows a schematic configuration diagram of an IP telephone system according to a first embodiment of the present invention, and a main apparatus 1. The main apparatus 1 connects a plurality of key telephone sets T1 to Tn (where n is a natural number) through an SIP network NW.

Figure 2:
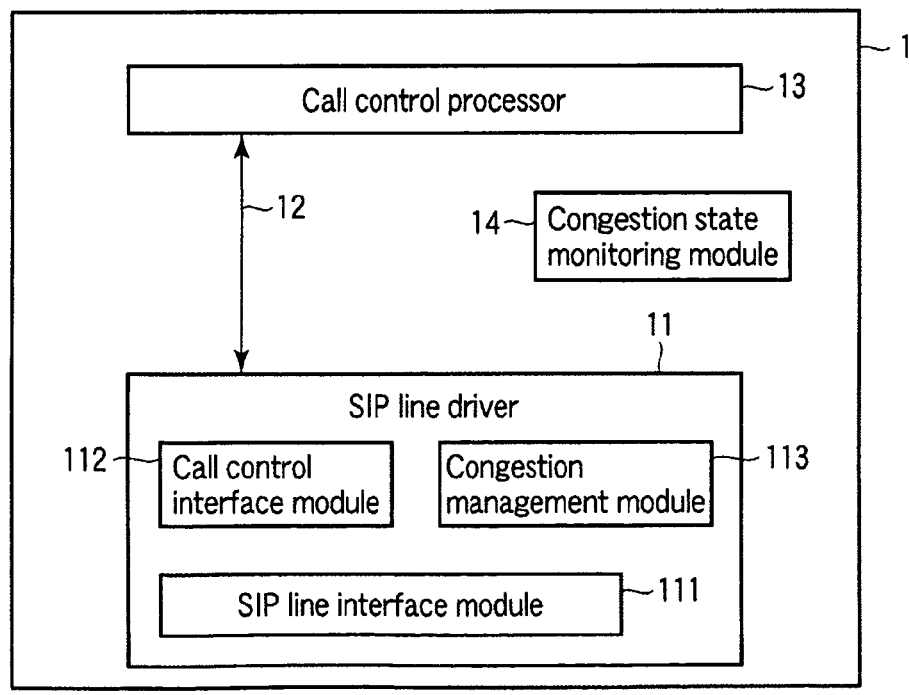
FIG. 2 is a block diagram showing a function configuration of a main apparatus shown in FIG. 1.

FIG. 2 is a block diagram showing a module configuration of the main apparatus 1.

That is, the main apparatus 1 includes an SIP line driver 11, a call control processor 13 (hereinafter referred to as the processor 13) connected to the SIP line driver 11 through a data highway 12, and a congestion state monitoring module 14 (hereinafter referred to as the monitoring module 14). Also, the SIP line driver 11 includes an SIP line interface module 111, a call control interface module 112, and a congestion management module 113.

The SIP line interface module 111 carries out interface processing with the SIP network NW. Also, the SIP line interface module 111 manages, for example, the key telephone sets T1, T2, and T3 that share at least one line on the SIP network NW among the plurality of key telephone sets T1 to Tn, as one group.

The call control interface module 112 carries out interface processing with the processor 13 through the data highway 12.

The processor 13 carries out call incoming and outgoing control, incoming call transfer control, control of notification of a state of each of the key telephone sets T1 to Tn, and the like.

The monitoring module 14 periodically monitors a congestion level that represents, for example, a data transmission amount on the data highway 12 or the SIP network NW per unit time, or a processing amount of the SIP line driver 11 or the processor 13 per unit time, and outputs information of the monitoring to the congestion management module 113 of the SIP line driver 11.

The congestion management module 113 determines whether or not a congestion level is equal to or higher than a predetermined level dd based on the monitoring information output from the monitoring module 14. When the congestion level is equal to or higher than the predetermined level dd, the congestion management module 113 notifies information showing a congestion state to the processor 13 and restricts a control signal necessary for service provision with respect to each of the key telephone sets T1 to Tn to be minimum. When the congestion level is 0, this means that the data highway 12, the SIP network NW, the SIP line driver 11, or the processor 13 shows an available state. When the congestion level is somewhere between 0 and dd, this means that the main apparatus 1 is in a normal state. When the congestion level is equal to or higher than dd, this means that the main apparatus 1 is in a congestion state.

In addition, the congestion management module 113 includes a recovery monitoring corresponding function with respect to a congestion state. The recovering monitoring corresponding function determines whether or not the main apparatus 1 has recovered from a congestion state to a normal state based on the monitoring information output from the monitoring module 14. When the main apparatus 1 has recovered, the recovery monitoring corresponding function resumes distribution of the control signal that has been restricted.

Next, description will be made with respect to operation of the system configured as described above.

Figure 3:
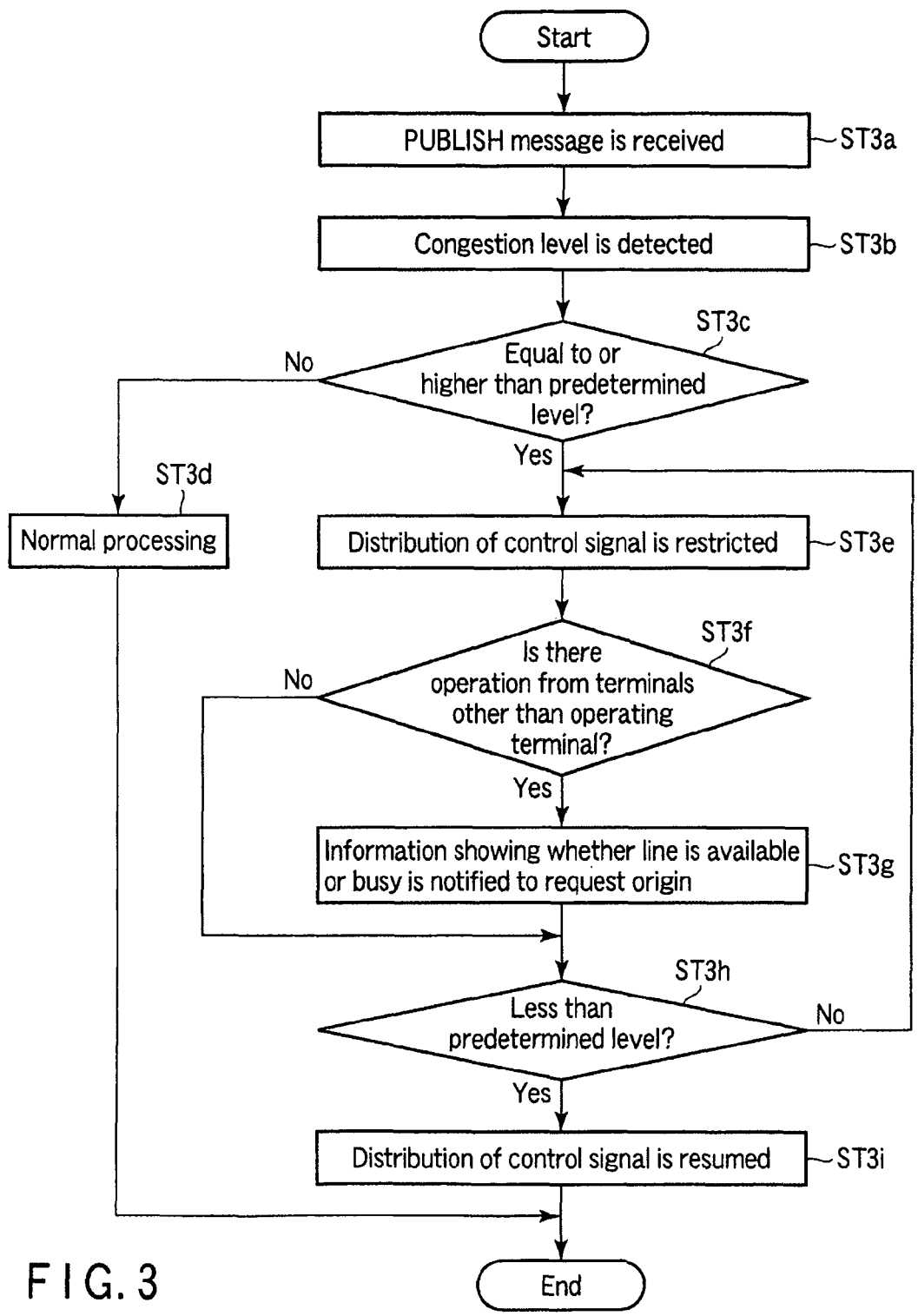
FIG. 3 is a flowchart showing a processing control procedure of the main apparatus at the time of call outgoing in the first embodiment.

FIG. 3 is a flowchart showing a processing control procedure of the main apparatus 1 at the time of call outgoing.

Now, the user using the key telephone set T1 is assumed to press a "Line 1" key as shown in FIG. 4. Then, a PUBLISH message, which is a request signal, is sent from the key telephone set T1 to the main apparatus 1.

When the main apparatus 1 receives the PUBLISH message (Block ST3a), the main apparatus 1 determines a current congestion state acquired from the congestion management module 113 (Block ST3b). Then, the main apparatus 1 determines whether or not a congestion level is equal to or higher than a predetermined level based on a result of the determination (Block ST3c).

Here, when the congestion level is lower than the predetermined level (No), the main apparatus 1 transmits a NOTIFY message to the key telephone set T1, and also carries out LED control of the "Line 1" keys of the key telephone sets T2 and T3, in which the same "Line 1" key is registered, in accordance with a call state by transmitting the NOTIFY message (Block ST3d).

On the other hand, when the congestion level is equal to or higher than the predetermined level, that is, when the main apparatus 1 is in a congestion state of some sort, the main apparatus 1 transits from Block ST3c to Block ST3e and adds extended information showing a congestion state to the PUBLISH message transmitted from the key telephone set T1, and the main apparatus 1 notifies the PUBLISH message to the processor 13 through the call control interface module 112.

The processor 13 that has received the PUBLISH message updates an available/busy state of the corresponding line as shown in FIG. 5 if the data showing a congestion state is added. However, the processor 13 sets the NOTIFY message transmitted for LED control of "Line 1" key to be addressed only to the key telephone set T1 that is an operation terminal, and does not transmit the message for LED control to the key telephone sets T2 and T3 having the same "Line 1" key at all.

In this state, for example, the user of the key telephone set T2 is assumed to press the "Line 1" key that is not lit. Then, the processor 13 of the main apparatus 1 transits from Block ST3f to Block ST3g, and notifies information showing whether "Line 1" is available or busy to the key telephone set T2 and displays the information on an LCD display device. In this manner, the user can know whether or not "Line 1" that the user desires to use has been used by checking the display.

Figure 6:
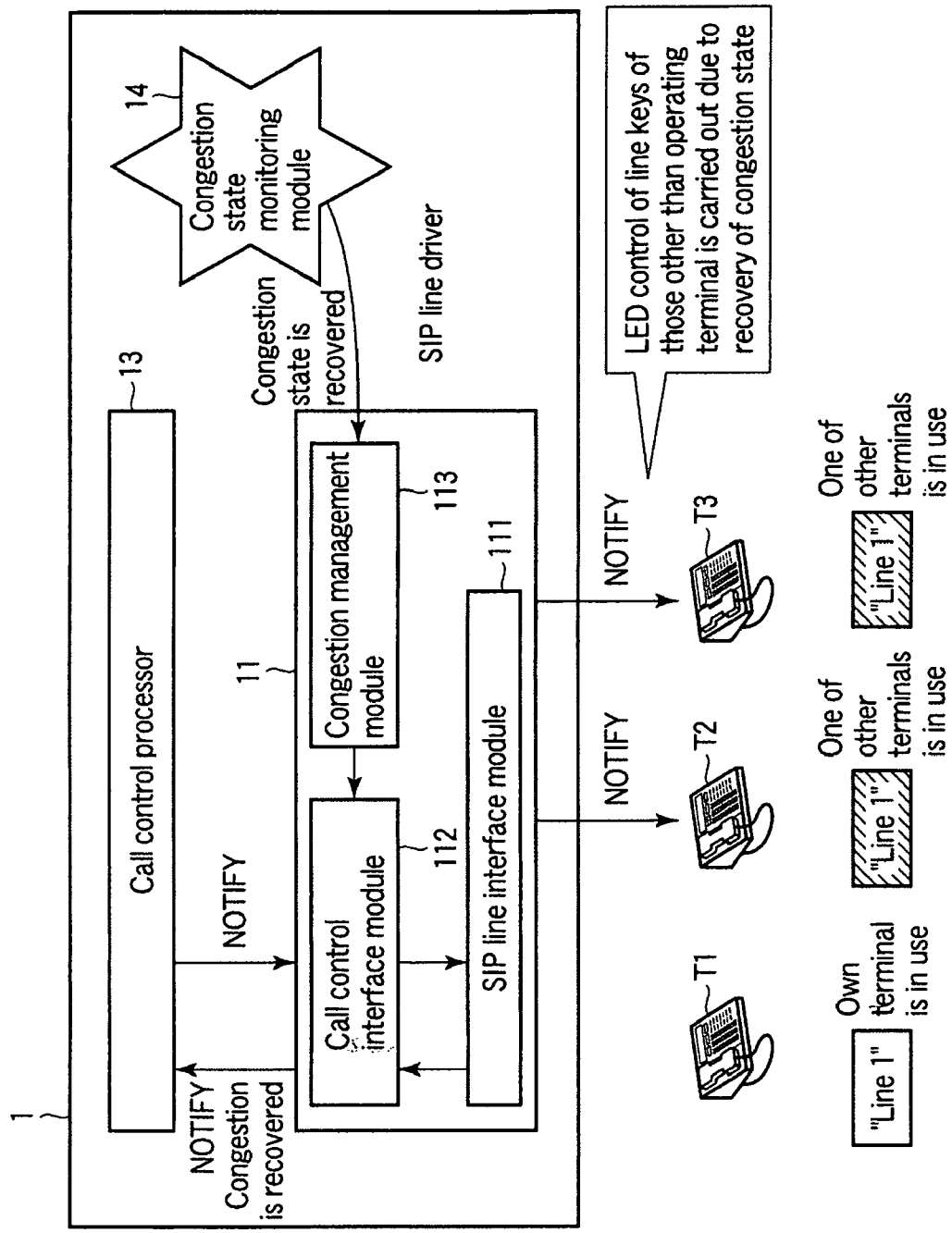
FIG. 6 is a sequence diagram shown to explain distribution operation of a control signal at the time a congestion state is recovered to a normal state in the first embodiment.

When the congestion level is determined to be lower than a predetermined level based on the monitoring information from the monitoring module 14 in the above state, the main apparatus 1 transits from Block ST3h to Block ST3i as shown in FIG. 6, and transmits a message for notifying recovery of congestion to the processor 13 through the call control interface module 112 so as to carry out refresh processing relating to LED control of the "Line 1" key. In this manner, the NOTIFY message is supplied to the key telephone sets T2 and T3, and the LEDs are lit. Therefore, by lighting the LEDs, the users of the key telephone sets T2 and T3 can know that "Line 1" has been used.

When the congestion level is equal to or higher than the predetermined level (No) in Block ST3h described above, the main apparatus 1 executes the processing from Block ST3e to Block ST3h repeatedly until the congestion level becomes lower than the predetermined level.

As described above, in the first embodiment, the monitoring module 14 monitors a congestion state of the main apparatus 1. When a congestion level of the main apparatus 1 is equal to or higher than a predetermined level, that is, the main apparatus 1 is in a congestion state, and when incoming call operation is carried out by using "Line 1" on the key telephone set T1 that belongs to a group registered to use "Line 1", the processor 13 is set to transmit a control signal necessary for LED control only to the key telephone set T1 and stop transmission of the control signal to the key telephone sets T2 and T3 that belong to the same group.

For this reason, when in a congestion state, a signal transmission amount on the data highway 12 and the SIP network NW is reduced and traffic on the data highway 12 and the SIP network NW can be reduced. In this manner, services relating to call incoming and outgoing can be continuously provided to each of the key telephone sets T1, T2, and T3, and the above configuration can contribute to prompt recovery from a congestion state to a normal state.

In addition, in the first embodiment, when a congestion state of the main apparatus 1 is recovered to a normal state, transmission processing of a control signal to the key telephone sets T2 and T3 that has been stopped by the processor 13 is automatically resumed. For this reason, when, for example, a congestion state of the main apparatus 1 is temporary and returns to a normal state, transmission processing of a control signal to the key telephone sets T2 and T3 that has been stopped can be promptly recovered without the need to wait for recovery operation by a maintenance engineer.

Further, in the first embodiment, when transmission processing of a control signal to the key telephone sets T2 and T3 is stopped due to a congestion state and LEDs for the "Line 1" keys on the key telephone sets T2 and T3 are not lit, and when the user of the key telephone set T2 presses the "Line 1" key, information showing whether "Line 1" is available or busy is notified to the key telephone set T2. Accordingly, the user of the key telephone set T2 can at least check whether the line the user request is available or busy.

Second Embodiment

A second embodiment of the present invention is made applicable to a case where multi-appearance that carries out all together calling to the key telephone sets T1, T2, and T3 in a group is executed.

For example, as shown in FIG. 7, an incoming call including an outgoing telephone number is assumed to arrive at the main apparatus 1 in accordance with outgoing of an external terminal TT1.

Figure 8:
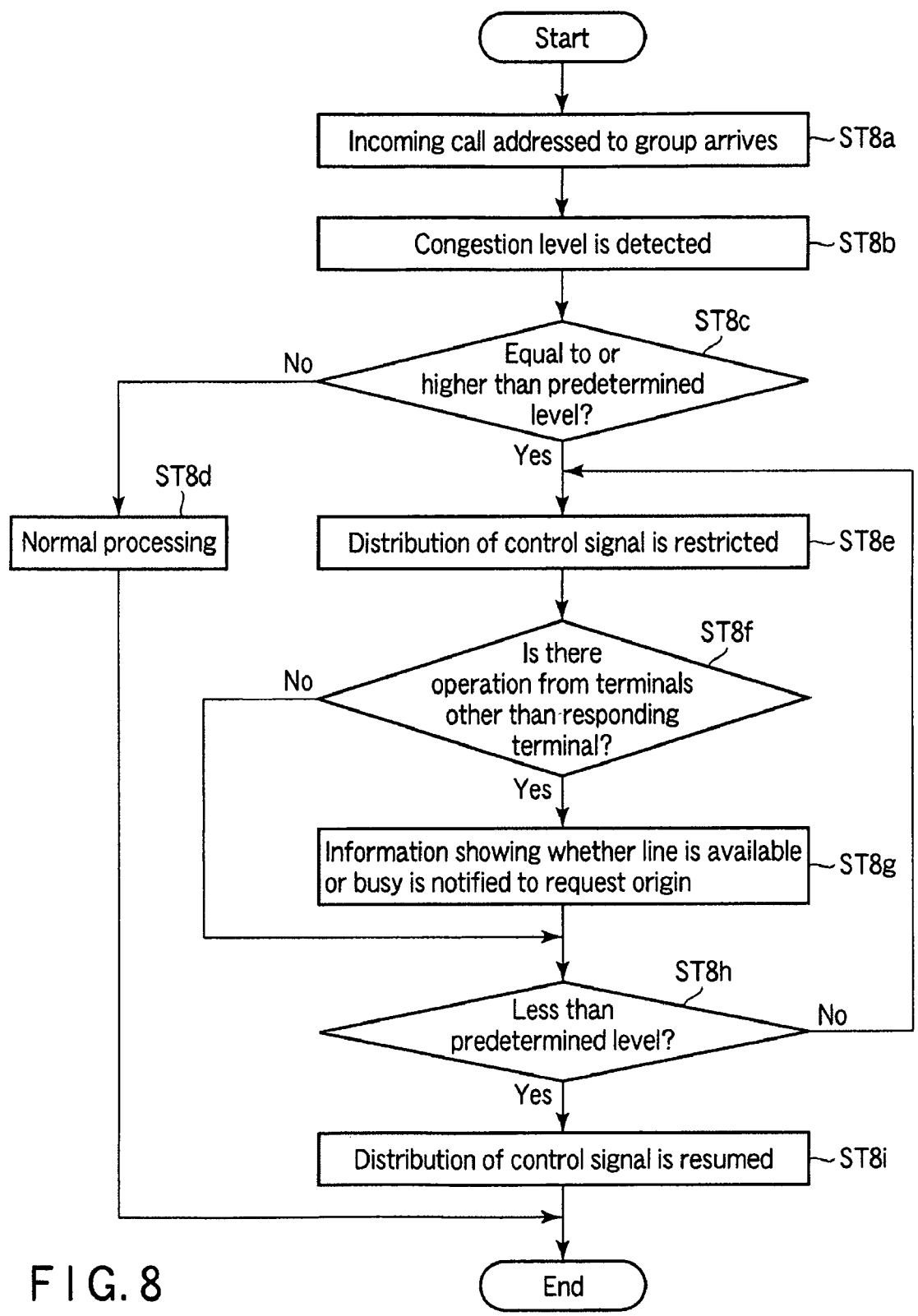
FIG. 8 is a flowchart showing a processing control procedure of the main apparatus at the time of multi-appearance in the second embodiment.

Then, the main apparatus 1 executes a control processing procedure shown in FIG. 8. That is, when the main apparatus 1 receives an incoming call (Block ST8a), the main apparatus 1 determines that destinations of the call are the key telephone sets T1, T2, and T3 that belong to Group 1 based on the incoming call.

On the other hand, the main apparatus 1 determines a current congestion state acquired from the congestion management module 113 (Block ST8b). Then, the main apparatus 1 determines whether or not a congestion level is equal to or higher than a predetermined level based on a result of the determination (Block ST8c).

Here, when the congestion level is lower than the predetermined level (No), the main apparatus 1 transmits a NOTIFY message for notification of an incoming call to the key telephone set T1, and also carries out LED control of the "Line 1" keys of the key telephone sets T2 and T3 in accordance with a call state by transmitting the NOTIFY message for notification of an incoming call (Block ST8d).

On the other hand, when the congestion level is equal to or higher than the predetermined level, that is, the main apparatus 1 is determined to be in a congestion state of some sort, the main apparatus 1 transits from Block ST8c to Block ST8e, and transmits the NOTIFY message for notification of an incoming call to the key telephone set T1 that is set as a destination of transmission of the NOTIFY message in advance. Then, the main apparatus 1 adds extended information showing a congestion state to a response message transmitted from the key telephone set T1 and notifies the response message to the processor 13 through the call control interface module 112.

The processor 13 receives the response message, and updates an available/busy state of the corresponding line if the data showing a congestion state has been added. However, the processor 13 sets the NOTIFY message transmitted for LED control of the "Line 1" key to be addressed only to the key telephone set T1, and does not transmit the message for LED control to the key telephone sets T2 and T3 having the same "Line 1" key at all.

In this state, for example, the user of the key telephone set T2 is assumed to press the "Line 1" key that is not lit. Then, the processor 13 of the main apparatus 1 transits from Block ST8f to Block ST8g, and notifies information showing whether "Line 1" is available or busy to the key telephone set T2 and displays the information on an LCD display device. In this manner, the user can know whether or not the "Line 1" that the user desires to use has been used by checking the display.

When the congestion level is determined to be lower than the predetermined level based on the monitoring information from the monitoring module 14 in the above state, the main apparatus 1 transits from Block ST8h to Block ST8i, and transmits a message for notifying recovery of congestion to the processor 13 through the call control interface module 112 so as to carry out refresh processing relating to LED control of the "Line 1" key. In this manner, the NOTIFY message is supplied to the key telephone sets T2 and T3, and the LEDs are lit. Therefore, by lighting the LEDs, the users of the key telephone sets T2 and T3 can know that "Line 1" has been used.

When the congestion level is equal to or higher than the predetermined level (No) in Block ST8h described above, the main apparatus 1 executes the processing from Block ST8e to Block ST8h repeatedly until the congestion level becomes lower than the predetermined level.

As described above, even in the second embodiment, when in a congestion state, a signal transmission amount on the data highway 12 and the SIP network NW is reduced and traffic on the data highway 12 and the SIP network NW can be reduced, as similar to the first embodiment. In this manner, services relating to call incoming and outgoing can be continuously provided to each of the key telephone sets T1, T2, and T3, and the above configuration can contribute to prompt recovery from a congestion state to a normal state.

Other Embodiments

The present invention is not limited to the embodiments described above. For example, in the first and the second embodiments described above, description was made with respect to an example where a SIP line driver and a call control processor are connected through a data highway. However, the present invention is not limited thereto, and the SIP line driver and the call control processor may be configured in an integral manner. In this case, control signals, such as the NOTIFY message, are distributed to a plurality of key telephone sets, for which the same line is registered, outside of the main apparatus.

In addition, description was made with respect to an example where the present invention is applied to a service relating to outgoing in the first embodiment and to a service relating to multi-appearance in the second embodiment. In addition to these examples, when a line is held and the hold is not released after a certain period of time has passed, a control signal for carrying out calling back may be transmitted to a key telephone set that holds the line, and not to other key telephone sets.

Further, in the above embodiments, description was made by exemplifying key telephone sets connected to an SIP network. The present invention can be applied to key telephone sets connected to an IP network in a similar manner.

Also, the present invention can be employed for other configurations and types of systems, other function configurations of the main apparatus, other types of terminals, such as a key telephone set, other distribution restriction procedures of a control signal at the time of congestion and contents thereof, and the like, by making a variety of modifications in a manner not deviating from a gist of the present invention.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A main apparatus which connects to an internet protocol (IP) network including a plurality of lines to connect a plurality of telephone terminals, and executes communication connection between the plurality of telephone terminals, the plurality of telephone terminals include at least a first and a second telephone terminal, at least the first and the second telephone terminals are included in a group sharing at least one of the plurality of lines, the apparatus comprising:
    a transmitter updates an available/busy state of the one of the plurality of lines, and transmits a control signal notifying a communication connection to the first telephone terminal included in the group and the second telephone terminal included in the group, when the first telephone terminal establishes the communication connection by using the one of the plurality of lines;
    a monitoring module configured to monitor congestion of at least the main apparatus; and
    a controller which controls execution and stoppage of transmission processing of the control signal to the second telephone terminal carried out by the transmitter based on a result of congestion monitoring carried out by the monitoring module.

2. The main apparatus of claim 1, wherein
    the controller carries out stoppage control of transmission processing of the control signal to the second telephone terminal carried out by the transmitter, when the controller determines that a congestion level acquired by the monitoring module is equal to or higher than a predetermined level.

3. The main apparatus of claim 2, wherein
    the controller carries out execution control of transmission processing of the control signal to the second telephone terminal carried out by the transmitter, when the controller determines that a congestion level acquired from the monitoring module is lower than the predetermined level after carrying out stoppage control of the transmission processing of the control signal to the second telephone terminal carried out by the transmitter.

4. The main apparatus of claim 2, wherein
    the controller notifies information showing whether the one of the plurality of lines is in an available or busy state to the second telephone terminal, when a request for use of the line is generated in the second telephone terminal after the controller carries out stoppage control of the transmission processing of the control signal to the second telephone terminal carried out by the transmitter.

5. The main apparatus of claim 1, wherein the transmitter comprises:
    a connecter which connects the IP network; and
    a processor which is connected to the connecter through a data highway and transmits the control signal to the first telephone terminal and the second telephone terminal through the data highway and the connector, when the first telephone terminal establishes communication connection by using the one of the plurality of lines, wherein the controller controls execution and stoppage of transmission processing of the control signal to the second telephone terminal carried out by the processor.

6. The main apparatus of claim 1, wherein
    the transmitter transmits the control signal to the first telephone terminal and the second telephone terminal when the first telephone terminal carries out outgoing operation that occupies the one of the plurality of lines.

7. The main apparatus of claim 1, wherein
    the transmitter transmits the control signal to the first telephone terminal and the second telephone terminal, when an incoming call addressed to the group arrives at the transmitter through the one of the plurality of lines.

8. The main apparatus of claim 1, wherein
    the transmitter transmits a control signal defined by a session initiation protocol (SIP) to the first telephone terminal and the second telephone terminal.

9. A control signal distribution regulation method used in a main apparatus which connects to an internet protocol (IP) network including a plurality of lines to connect a plurality of telephone terminals, and executes communication connection between the plurality of telephone terminals, the plurality of telephone terminals include at least a first and a second telephone terminal, at least the first and the second telephone terminals are included in a group sharing at least one of the plurality of lines, the method comprising:
    monitoring congestion of at least the main apparatus;
    updating an available/busy state of the one of the plurality of lines and transmitting a control signal notifying a communication connection to the first telephone terminal included in the group and the second telephone terminal included in the group, when the first telephone terminal establishes the communication connection by using the one of the plurality of lines, and when a congestion level based on a result of the monitoring of congestion is lower than a predetermined level; and
    stopping transmission processing of the control signal to the second telephone terminal, when the congestion level based on the result of the monitoring of congestion is equal to or higher than the predetermined level.

* * * * *